(12) United States Patent
Mangin et al.

(10) Patent No.: US 7,805,538 B2
(45) Date of Patent: Sep. 28, 2010

(54) METHOD AND DEVICE ADDRESS MANAGEMENT

(75) Inventors: Christophe Mangin, L'Hermitage (FR); Romain Rollet, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 986 days.

(21) Appl. No.: 11/008,103

(22) Filed: Dec. 10, 2004

(65) Prior Publication Data

US 2005/0141515 A1 Jun. 30, 2005

(30) Foreign Application Priority Data

Dec. 19, 2003 (EP) .................................. 03293247

(51) Int. Cl.
*G06F 15/16* (2006.01)
*H04J 3/22* (2006.01)

(52) U.S. Cl. ........................ 709/245; 370/392

(58) Field of Classification Search ................ 709/221, 709/245; 370/392, 469, 474–475
See application file for complete search history.

(56) References Cited

U.S. PATENT DOCUMENTS 7,289,463 B2 * 10/2007 Ozugur ........................ 370/328
7,356,032 B1 * 4/2008 Sumorok ..................... 370/392

FOREIGN PATENT DOCUMENTS

WO WO 00/36794 6/2000

OTHER PUBLICATIONS

IETF RFC 826, An Ethernet Address Resolution Protocol (ARP), Nov. 1982.*
IETF RFC 925, "MultiLAN Address Resolution", Oct. 1984.*
IETF RFC 2390 "Inverse Address Resolution Protocol", Sep. 1998.*
W. Richard Stevens, "TCP/IP Illustrated, vol. 1", 1993, chapter 1 to 5.*
IETF RFC 1042, "A Standard for the Transmission of IP Datagrams over IEEE 802 Networks", Feb. 1988.*
C. Perkins, IETF RFC 2002, "IP Mobility Support", section 4.6, 1996.*

* cited by examiner

*Primary Examiner*—William C Vaughn, Jr.
*Assistant Examiner*—Shirley X Zhang
(74) *Attorney, Agent, or Firm*—Oblon, Spivak, McClelland, Maier & Neustadt, L.L.P.

(57) ABSTRACT

A method and a device of address management in a network which comprises a plurality of devices, including at least one STAtion (STA), and at least one Address Resource Management (ARM) unit. Each of the devices includes a stack of communication protocol layers comprising at least an Upper Layer (UL) and a Lower Layer (LL). The UL of each of the devices has a respective UL address within the network. The ARM unit associates, respectively disassociates, some of the devices in at least one LL network. The devices of a given LL network are allowed to exchange together data packets emitted and received at the LL level. The ARM unit allocates, respectively releases, one given LL address per each associated device, respectively disassociated device, in a given LL network. Besides, the ARM unit handles one ARM Translation Table (TT) per LL network. The TT comprises one entry per device of a given LL network and each entry comprises the UL address and the LL address.

39 Claims, 9 Drawing Sheets

METHOD AND DEVICE ADDRESS MANAGEMENT

BACKGROUND OF THE INVENTION

1. Technical Field

The present invention relates generally to the field of data transmission and more particularly to a method of Address Management for any device in a given network.

2. Related Art

An address is a data structure understood by all devices of a given network, which uniquely identifies a device within a network. An address is a key information for routing and correctly forwarding a given packet from a source device to a destination device. Obviously, the source device needs to have the address of the destination device and the destination device needs to know which device the received packet comes from and therefore needs to have the address of the source device. An Address Management scheme is in charge of making the source device able to transmit a packet to a destination device and of making the destination device able to identify the source device in order to handle correctly a received packet. An efficient Address Management in a network is very important in order to simplify some basic network administration features and to increase the performance of the communication protocols within the network.

More generally, the Address Management scheme in a given network is in charge of resolving the following main problematic topics: the address allocation, the address resolution, which is performed at different stages during a packet transmission (it is performed on a transmitter side and on reception side or in an interconnection device when at least one is involved in the transmission packet process), and finally the optimisation of addresses transmitted over the medium.

Before considering each of these three listed topics and analysing their impact on the performance of the communication protocols, the following section introduces some basic principles required for the detailed description.

According to the OSI ("Open System Interconnect") model of ISO ("International Standardization Organization"), each layer of a stack of communication protocols is independent from the others. These layers need to exchange packets with the other layers of the other devices in a given network. It results from this that each layer in each device, which needs to exchange a packet, needs to be identified by a given address which is unique within the given network. For the sake of better understanding, the following description will consider a network of devices including a stack wherein two layers need to be addressed: an Upper Layer (UL) and a Lower Layer (LL) and the devices that can exchange packets through the UL or the LL constitute respectively a UL network or an LL network. A UL network can include several LL networks. Each device of a UL network has a UL address to address its UL layer, this address being unique within the corresponding UL network. Further, each device of an LL network has an LL address to address its LL, this address being unique within the corresponding LL network.

Regarding the Address Management, a packet transmission process can be described according to the following steps, wherein a source device transmits a UL packet to a destination device:

on the transmitter side:
the UL transmits down the UL packet to the LL, the UL has the UL address corresponding to the destination UL;
the LL receives the UL packet and is in charge of transmitting it to the LL of the destination device, transmitting this packet down the stack until reaching the physical layer;

on the receiver side:
the LL receives the packet through the stack from the physical layer, the LL is in charge of retrieving the LL address of the source device before transmitting the received packet to the UL;
the UL receives the packet from the LL, and is in charge of retrieving the UL address of the source device.

From this basic description, it results that, firstly, the UL and the LL being independent, it is required to make them able to convert an LL address into a UL address and vice versa, and secondly it is required to transmit some addresses through the medium from the source device towards the destination device in a so-called address part of the messages.

It shall be noted that whereas the three topics listed above are linked together, the following section will consider them one after the other for convenience reason.

Regarding the listed first topic, namely the address allocation scheme, the address of each layer of each device in a network can be allocated according to two different ways: either statically or dynamically. In the first case, the administrator fixes the layer addresses for all devices in the corresponding network so that there is no address conflict. But in this case the address resource is not optimized, and then this type of address allocation is applicable to a network where the address resource is not scarce. Moreover, as soon as a network comprises a lot of devices, the address format will be a long format. Consequently, the address part included in each transmitted packet over the medium could consume a lot of transmission resource by increasing the signalling overhead. In order to optimise the address format, and then to reduce the corresponding signalling overhead, a dynamic address allocation scheme is preferably used. In this case, a particular device in the network is in charge of allocating the addresses by handling a pool of available addresses. Therefore, an optimisation of the address resource is allowed and consequently the address format and the corresponding signalling overhead can be reduced.

The second topic concerns the address resolution. The address resolution refers to the process of finding an address of a given device in a given network. Depending on the step in a packet transmission process, the address resolution can be performed either by retrieving the searched address from the address part of a packet, or by performing an address conversion from a given address into the searched address. Obviously the simplest method to perform an address resolution is to apply the first proposed way. But it is not applicable to a network where the transmission resource is scarce. Actually, as mentioned previously, the longer the address part is, the longer the signalling overhead is. Therefore, regarding the transmission resource, the most efficient address resolution scheme is the second proposed way. It refers more precisely to find an LL or UL address of a device when respectively UL or LL address is known. Actually, as described above, an address conversion may be performed at different steps during a packet transmission depending on the chosen Address Management scheme. Consequently, in order to increase the performance of the communication protocol, the address conversion needs to be efficient and fast. Moreover, an efficient address conversion process applied in the case of dynamic address allocation is able to increase again the efficiency of the communication protocol.

A simple way to provide an address conversion process is to allocate to a given device the same address to the UL and the LL. In this case, it is an euphemism to say this address conversion process is efficient and rapid. But generally, the address format of the UL is longer than the address format of the LL layer. It results from this that an important overhead at the LL level is induced. When the LL protocol generates short signalling messages or when short data packets are transmitted, adding long addresses can be prohibitive regarding the transmission resource.

Assuming that the LL address and the UL address for a same device are different, a second address conversion process consists of performing the address resolution at the UL level. On the transmitter side, when the packet is passed from the UL to the LL, the addresses of the LL layer of the destination device is passed as parameters. Therefore, no resolution address is performed at LL level. On the receiver side, the UL is in charge of performing the address conversion process. This scheme does not allow a flexible implementation because one particular address resolution per LL network included in the UL network needs to be managed at the UL level. This can be complex when a UL network relies on several LL networks with different protocols.

A third address conversion process proposes to perform the address conversion within the LL. Stated otherwise a packet is transmitted from the UL to the LL with the UL address of the destination device passed as parameter. From the UL address of the destination device, the LL retrieves the corresponding LL address. This scheme is more advantageous because a single UL network can rely on different LL networks in a transparent way.

The third topic, namely the optimisation of addresses transmitted over the medium refers to the amount of UL addressing information required to be transmitted in each packet over the medium in the address part of the packet. It shall be noted that the address part is used to correctly forward the packet to the destination, particularly when the packet is addressed to a device only accessible via an interconnection device as a gateway which takes the forwarding decisions based on at least one of the UL addresses carried in the address part of the transmitted packet, and also used to make the destination device able to retrieve the UL address of the source device in order to handle the received packet. In order to limit the signalling overhead generated with the address part, it is very important to select the UL addresses which are mandatory to be carried. This address selection depends on the conversion address process.

In the prior art, different allocation address schemes and different address resolution schemes are disclosed as for instance respectively the Dynamic Host Configuration Protocol (DHCP) and the Address Resolution Protocol (ARP). The prior art provides some Address Management schemes which can be easily implemented in wireless networks but based on too long address format which increase the signalling overhead and consume a lot of transmission resource. Regarding the address resolution scheme, the ARP is a protocol used by the Internet Protocol (IP) to convert the IP network addresses to addresses used by a data link protocol. The protocol operates below the IP network layer as a part of the OSI link layer, and is used when the IP is used over Ethernet. In this case, when a device in the network needs to have a conversion between an Ethernet address and an IP address, it broadcast a request on the network. The matching device returns its own Ethernet and IP addresses to the requesting device. However, this protocol is not easily applicable to a wireless network due to the fact that broadcast is not reliable in such a network.

SUMMARY OF THE INVENTION

In view of the foregoing, there is a need for an Address Management scheme applicable to a wireless network which is able to increase the performance and the protocol efficiency.

The invention proposes a method of Address Management in a network which comprises a plurality of devices, comprising at least one STAtion (STA), and at least one Address Resource Management (ARM) unit, wherein each of the devices includes a stack of communication protocol layers comprising at least an Upper Layer (UL) and a Lower Layer (LL), the UL of each of the devices having a respective UL address within the network, the method comprising the following steps of:

associating, respectively disassociating, some of the devices in at least one LL network, which devices being allowed to exchange together data packets emitted and received at the LL level, the associating including the devices sending their UL address to the ARM unit;

allocating, respectively releasing, one given LL address per UL address of each one of the devices which are associated, respectively disassociated, in a given LL network, the allocating being carried out by the ARM unit; and handling one ARM Translation Table (TT) per LL network, the TT comprising one entry per device of a given LL network, which entry comprising the UL address and the LL address, the handling being carried out by the ARM unit.

On the other hand, the invention proposes an Address Management device for use in a network comprising a plurality of devices, comprising at least one STAtion (STA), and at least one Address Resource Management (ARM) unit, wherein each of the devices includes a stack of communication protocol layers comprising at least an Upper Layer (UL) and a Lower Layer (LL), the UL of each of the devices having a respective UL address within the network, the devices comprising means for carrying out the method of Address Management.

BRIEF DESCRIPTION OF THE DRAWINGS

Further features and advantages of the present invention will become more apparent from the description below. This is given purely by way of illustration and should be read in conjunction with the appended drawings, of which.

DESCRIPTION OF PREFERRED EMBODIMENTS

The present invention is described herein below in one exemplary application to a network composed by devices, each device including a stack of communication protocols with two layers UL and LL addressed in a network, which stack being according to the OSI ("Open System Interconnect") model of ISO ("International Standardization Organization"). More precisely, in one embodiment, one UL network including two different LL networks is considered. A transmission within a given LL network is referred to as an internal transmission, whereas a transmission from an LL network to another one is referred to as an external transmission. Of course, the scope of the invention encompasses applications to any stack of communication protocol layers with as many addressed layers as it is needed, and then more networks and sub networks than in the present exemplary application. Globally, the present invention can be applied to any connection-less protocol that implements a centralised Address Management. The protocol supports internal packet transmission and external packet transmission. In addition, the present invention supports an interconnection of LL networks with different LL protocols.

Each LL network includes a particular device which is an Address Resource Management (ARM) device, being in charge of:
associating, respectively disassociating, a device to the corresponding LL network, stated otherwise admitting a new device in the LL network;
allocating, respectively releasing, the LL addresses for all associated devices in this LL network, while a list of associated devices, respectively disassociated, within the LL network is maintained in order to keep the relationship between UL and LL addresses;
processing an Address Management protocol when a device requests it according to information retrieved from the list.

The ARM unit has a permanent LL address known from all the associated devices.

A Gateway (GW) is involved in the transmission process when a packet is emitted by a device belonging to one LL network towards a device belonging to the other one LL network. The GW is a particular device with as many LL addresses as LL networks it belongs to.

Figure 1:
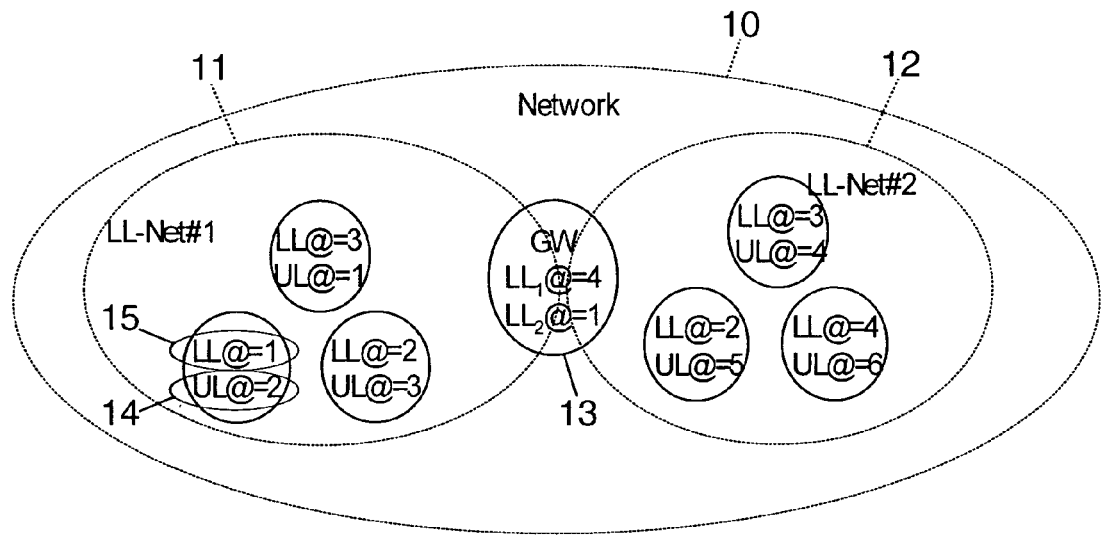
FIG. 1 is a view of an exemplary UL network and networks LL networks.

FIG. 1 is a view of an exemplary UL network and sub networks LL networks. In this figure, the GW belonging to a first LL network LL-Net#1 and to a second LL network LL-Net#2 has two LL addresses. A UL address is assigned to all of the devices, but the GW, associated in LL-Net#1 and in LL-Net#2, each UL address being unique over the UL network and therefore over both LL networks. A given LL address is unique within a given LL network.

The present invention is based on the following aspects:
an Address Management protocol
operations performed by the ARM unit
operations performed by all STAs
operations performed by the gateway.

Each of these 4 aspects will be described below.

Figure 2:
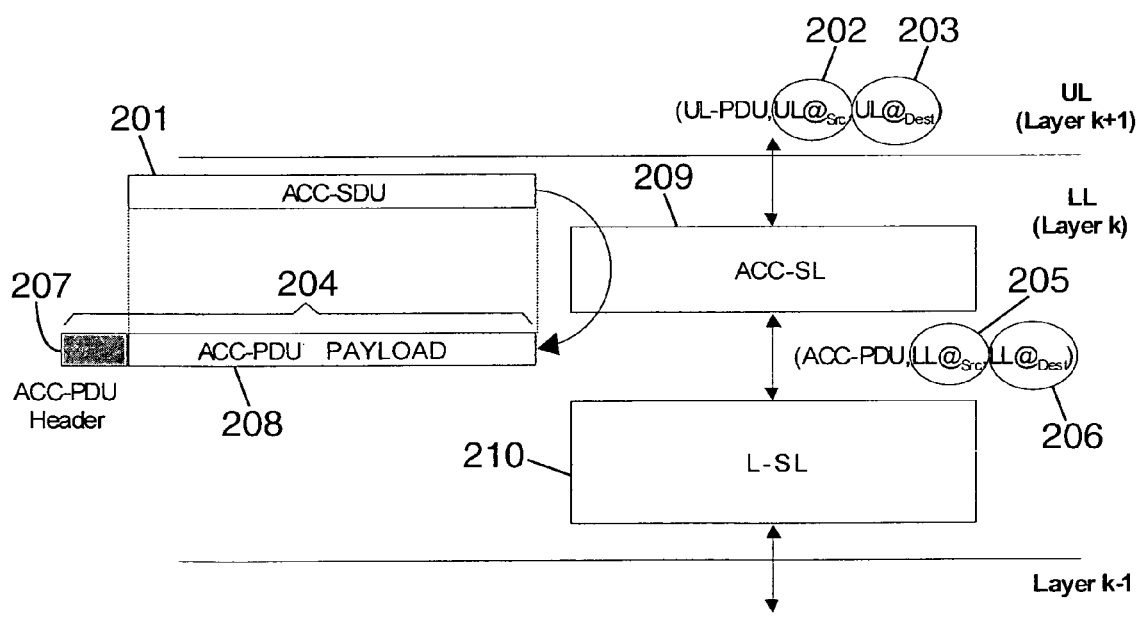
FIG. 2 illustrates the LL structure and the data flow within the LL layer according to the present invention.

Regarding the Address Management protocol, in each LL of each device, an Address Conversion Control Sub-Layer (ACC-SL) 209 is introduced, as it is illustrated in FIG. 2. The ACC-SL is in charge of performing the address conversion between the LL address and the UL address. The LL further comprises a Lower Sub-Layer (L-SL) 210.

Upon a data packet transmission, the ACC-SL acts as a classical OSI layer. The UL passes a UL Protocol Data Unit (UL-PDU) packet to the LL. The LL handles it as an LL Service Data Unit (LL-SDU) packet and transforms it into an LL-PDU packet. More precisely within the LL, the ACC-SL handles the received UL-PDU packet as an ACC-SDU 201 and transforms it into an ACC-PDU packet 204 before passing it to the corresponding L-SL 210. ACC-SL adds an ACC-PDU header 207 to the received ACC-SDU packet 201, this ACC-PDU header 207 containing address information useful for the destination device and for a GW between LL networks if the given packet transmission is external.

During the signalling messages exchange, this will be disclosed in detail latter, the ACC-SL 209 of different devices exchanges specific signalling messages through the L-SL 210. In particular, the correct delivery of signalling messages sent by the ACC-SL is guarantied by the L-SL except for broadcast messages. The ACC-SL has a different implementation and operation depending on the device: the ARM unit, the GW or the STAtion (STA) In a preferred embodiment of the invention, the ACC-SL of a STA or a GW are allowed to exchange signalling messages with the ACC-SL of the ARM unit only.

More particularly, FIG. 2 illustrates the data flow within the LL according to one embodiment of the invention. The UL transmits a PDU packet, which is referred as an ACC-SDU packet 201 within the ACC-SL 209. The source and the destination UL addresses 202 and 203 of the UL PDU are specified as parameters UL@src and UL@dest for each UL-PDU packet transmission. The ACC-SL encapsulates the ACC-SDU packet 201 into an ACC PDU packet 204 before sending it to the L-SL 210 by indicating the source and destination LL addresses 205 and 206 associated to the packet as parameters LL@src and LL@dest. The reverse processing is performed when the ACC-PDUs are received from the L-SL 210 by the ACC-SL 209.

The UL address of a given device is supposed to be known by the ACC-SL instance local to the same device. The ACC-PDU packet 204 contains an ACC-PDU header 207 and a payload field 208 that contains the ACC-SDU packet received from (or sent to) the UL. The ACC-PDU header 207 has a variable size. The following table lists each field comprised in the ACC-PDU header 207.

TABLE I

| ACC-PDU Type | source-UL-Address | destination-UL-Address |
| --- | --- | --- |

The first field, namely ACC-PDU Type, is always present in order to inform about the presence of the other fields.

Actually, four ACC-PDU type values are defined in order to select which addresses will be carried over the medium in the transmitted packet. The four values are explained in the following table:

TABLE II

| ACC-PDU Type | Description |
| --- | --- |
| 0 | Both source-UL-Address and destination-UL-Address fields are not present. |
| 1 | source-UL-Address field is present only. |
| 2 | destination-UL-Address field is present only. |
| 3 | Both source-UL-Address and destination-UL-Address fields are present. |

The previous ACC-PDU Type values will be referred to as ACC-PDU of type 0, ACC-PDU of type 1, ACC-PDU of type 2 and ACC-PDU of type 3.

The Address Management protocol according to a preferred embodiment of the invention is based on the ACC-SL signalling messages defined in the following table:

TABLE III

| Message | Parameters | Description |
| --- | --- | --- |
| Lower Layer Address Request (LLAR) | LL-Address | LLAR message is sent by devices to the ARM unit in order to request the LL Address corresponding to the specified UL Address. |
| Upper Layer Address Request (ULAR) | UL-Address | ULAR message is sent by devices to the ARM unit in order to request the UL Address corresponding to the specified LL Address. |
| Address Relationship Indication (ARI) | LL-Address UL-Address Location | ARI message is broadcast by the ARM unit to all associated devices of the LL network it manages to advertise an LL-UL address couple. UL-Address is marked as Invalid if the LL-Address is not recognized as valid by the ARM unit. LL-Address is marked as Invalid if the UL-Address is not recognized as valid by the ARM unit (corresponding devise is not associated). Both LL-Address and UL-Address cannot be simultaneously set to Invalid. The Location information indicates weather the device is a device in the LL network (Internal) or an external one (External). In this latter case, the UL-Address contains the address of the corresponding GW. |

Now, the messages of the Address Management protocol have been defined. The following description will describe the operations performed with them.

Concerning the operations of the ARM unit, in addition to being in charge of processing the Address Management protocol, the ARM unit is also in charge of address allocation. Therefore, the ARM unit handles two following elements:

a Free Address List, which contains the list of the available LL addresses, which can be allocated to the newly associated devices;

an ARM Translation Table (ARM TT), which contains a list of entries, each of entry representing an associated device via its UL address (sent by the device during the association process), the LL address allocated by the ARM unit after the association process and the status field as it is disclosed in the following table. In a preferred embodiment of the invention, two values are possible to set this status field, either normal or defunct. The number of the entries is then equal to the number of the associated devices managed by the ARM unit in the corresponding LL network.

TABLE IV

| ARM Translation Table | | |
| --- | --- | --- |
| UL-Address List | LL-Address | Status (Normal/Defunct) |

When the device is a GW, the UL address contains a list of UL addresses corresponding to devices managed by the given GW and not belonging to the LL network the corresponding ARM unit belongs to. However, one of the GW can be considered as default GW and its corresponding entry is used to manage devices which UL address is unknown by the ARM. In this case, the UL-Address List of the default GW entry is empty.

Regarding the FIG. 1, the ARM unit of the network LL-Net#1 contains the following list:

UL@=1

UL@=2

UL@=3.

Moreover, a timer T(ARM, FreeLLAi,i) is defined for each entry of the ARM TT. The usage of this timer will be explained later on in the following description.

Both ARM TT and Free Address List handled by the ARM unit are updated each time a new device is associated to the LL network managed by this ARM unit, and each time an associated device is no longer associated. In the first case a new entry is created in the ARM TT with an LL address picked up from the Free Address List. For the second case, an entry is removed but under some conditions in order to avoid some cross effects as it is described below.

Each time a new device i is associated by the ARM unit with the UL address ULAi, an LL address LLAi is chosen from the Free Address List. Then, a new entry is added into the ARM TT that contains ULAi and the newly attributed LLAi. If the device is a GW, the entry can be extended with the list of the external addresses managed by the GW. The ARM unit broadcasts an ARI message with LLAi and ULAi, and with the corresponding Location information.

When a device i is disassociated, the ARM unit broadcasts an ARI message with the LL address field comprising LLAi and the UL address field comprising an invalid value. Of course, the invention encompasses any manners to mark an address as invalid to inform other devices about the invalidity of value filled in the UL address field, as for instance using a flag to inform about the invalidity of an address. Anyway, the respective entry in the ARM TT is set as Defunct using the Status field and the timer T(ARM, FreeLLA, i) is started. When this timer expires, the respective entry is removed from the ARM TT and the LLAi address is returned to the Free Address List. With a correct value of the timer, this mechanism prevents from eventual address inconsistency in the devices that could have missed an ARI message.

Concerning the operations of the STAs, they are based on an STA Translation Table. That STA TT contains a list of entries, each of which representing an associated device of the LL network or a UL network device outside the LL network that is reachable through a GW. To avoid having an STA TT with too many entries, only the entries of the devices communicating with the given STA are kept by using a timer.

An entry of the STA TT is represented below:

TABLE V

STA Translation Table

| UL-Address | LL-Address | Location (Internal/External) |
|---|---|---|

In a preferred embodiment of the present invention, two permanent entries are always present in the STA TT:
- one corresponding to the own addresses of the given STA, (UL address (own), LL address (own), internal);
- the other one corresponding to reserved addresses used for broadcasting messages, (UL address (broadcast), LL address (broadcast), external).

On the other hand, for each entry, except permanent ones, in the STA TT, a timer T(STA, Time To Live (TTL), i) is defined. This Time To Live timer allows to clean the STA TT and to remove the entries not used by the STA. In a preferred embodiment of the invention, the initial value of T(STA, TTL,i) will be lower than the initial value of T(ARM, FreeL-LAi, i) to prevent from an eventual address inconsistency.

In each STA, on reception of an ACC-PDU packet from the L-SL, the ACC-SL retrieves the source UL address 202 and the destination UL address 203 in order to pass them as parameters up to the UL.

Figure 3:
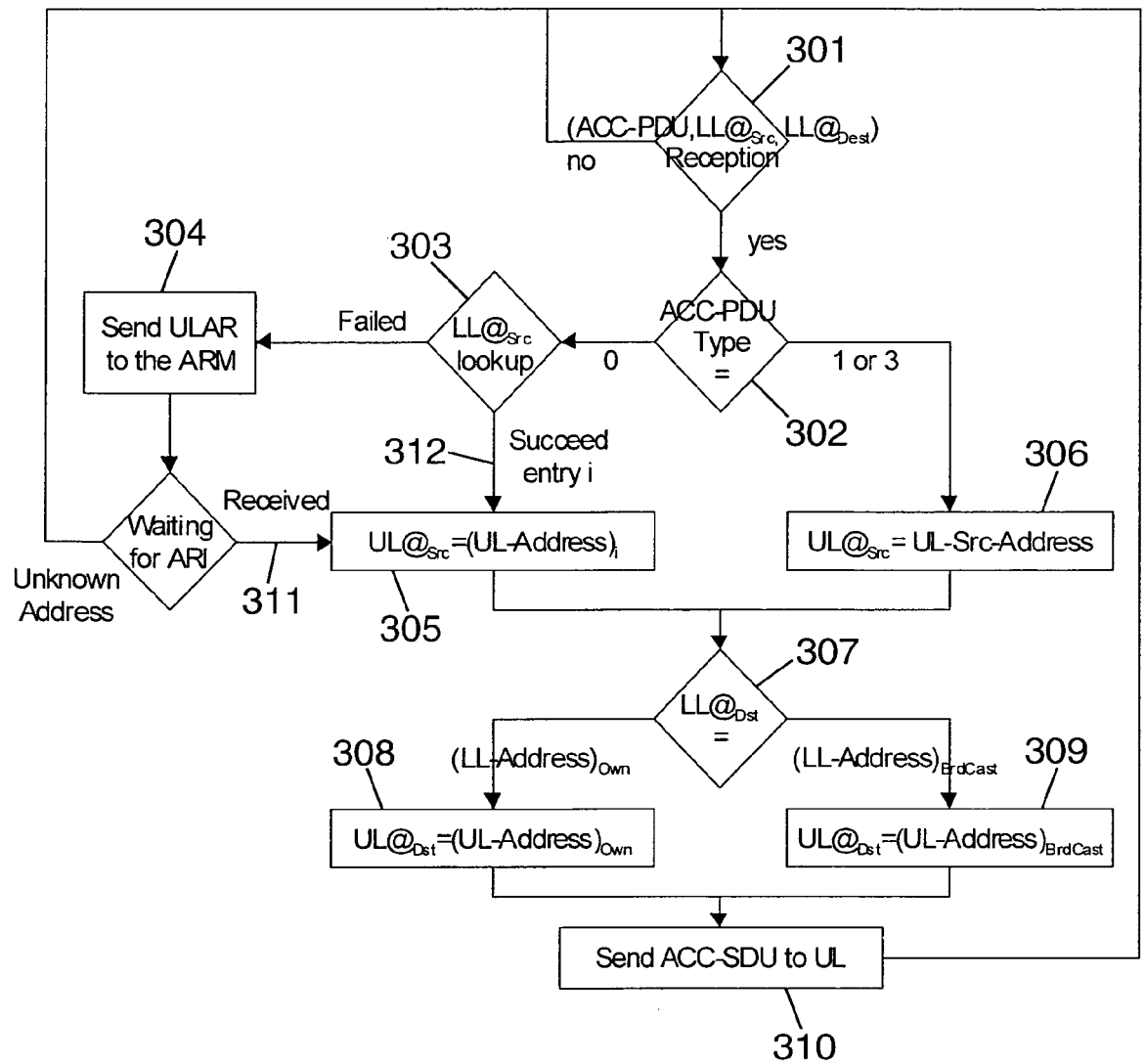
FIG. 3 is a flow chart of the processing steps carried out by a device on reception of a packet at the LL level according to one embodiment of the present invention.

FIG. 3 is a flow chart of the steps carried out by a STA on reception of a packet from the L-SL by the ACC-SL according to one embodiment of the present invention. Firstly, the ACC-SL performs step 301 by receiving the ACC-PDU and the source LL address and the destination LL address passed as parameters by the L-SL. Then the ACC-SL performs step 302 by determining the value comprised in the ACC-PDU header in order to decide how to retrieve the source UL address 202:

in case of an ACC-PDU type 0, the source and destination UL are not present in the ACC-PDU header, and then the ACC-SL looks up an entry matching the source LL address in its STA TT, illustrated by step 303. If the entry is found in the STA-TT, corresponding to step 312, the source UL address is retrieved from it. If the entry is not found (e.g. the given STA has not transmitted data for a long time and then the corresponding entry has been removed in the STA TT), the given STA sends a ULAR message to the ARM unit to request the source UL address 202 corresponding to the received source LL address corresponding to step 304. An ARI message is received in response, in step 311, containing the source UL address 202 illustrated by step 305.

In case of an ACC-PDU type 1 or 3, the source UL address 202, to be passed as parameter to the UL, is extracted from the source-UL-address field located in the ACC-PDU header illustrated by step 306.

In one embodiment of the invention, the destination UL address 203 is filled with either the UL address (own) or the UL address (broadcast) as respectively in step 308 or 309, by looking up an entry matching the destination LL address illustrated by step 307.

STA updates its STA TT and then provides this packet to the UL with source UL address 202 and destination UL address 203 passed as parameters as indicated in step 310.

Figure 4:
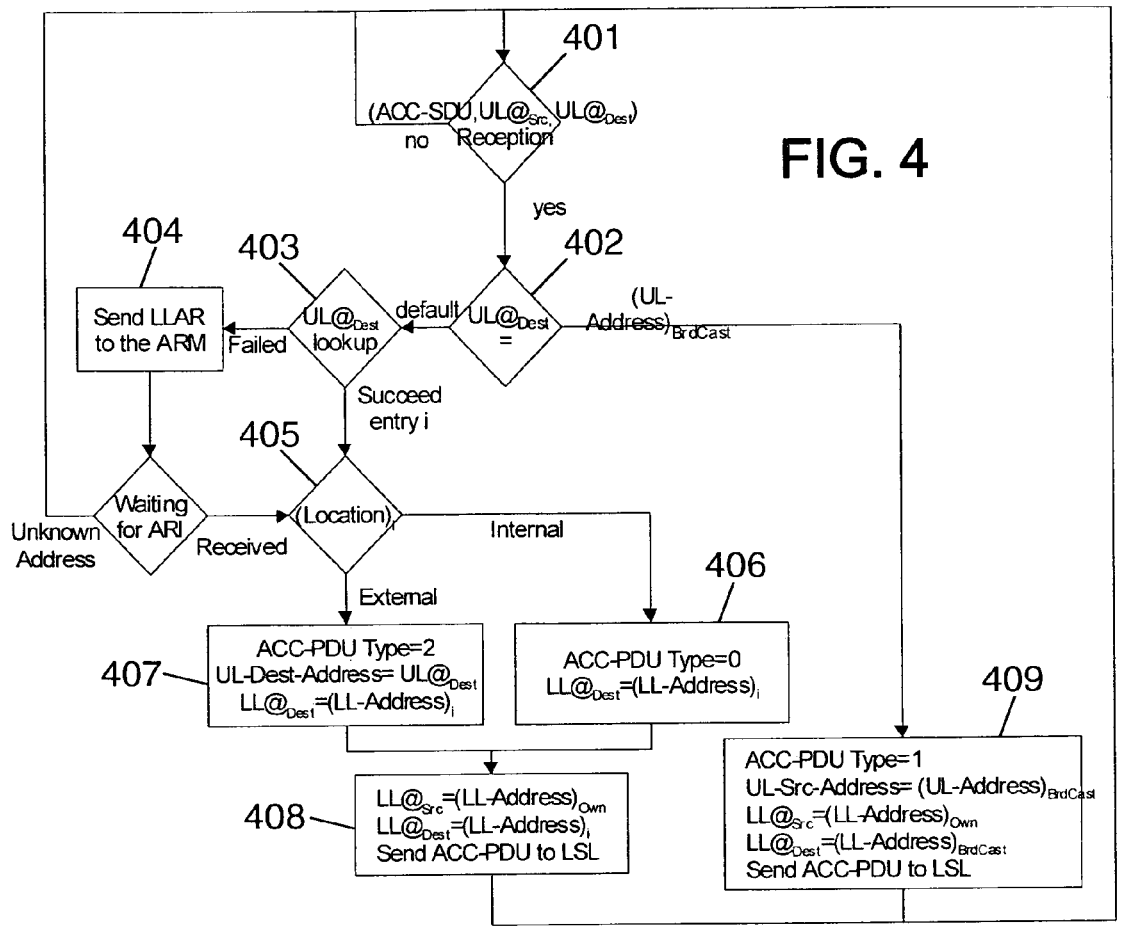
FIG. 4 is a flow chart of the processing steps carried out by a device on transmission of a packet at LL level according to one embodiment of the present invention.

FIG. 4 is a flow chart of steps carried out by a STA on transmission of a packet from the ACC-SL to the L-SL according to one embodiment of the present invention. On packet transmission, the source LL address and the destination LL address are passed as parameters, while the destination UL address 203 and the source UL address 202 have been received as parameters from the UL as illustrated in step 401.

The step 402 is performed to detect if the destination UL address 203 is an address used for broadcasting the message and if it is, the ACC-SL performs step 409. Else, the ACC-SL carries out step 403 by looking up an entry matching the destination UL address 203 parameter. If lookup fails, an LLAR message is sent to the ARM unit to request the destination LL address corresponding to the destination UL address 203 received as parameter in step 404. An ARI message is received providing the requested destination LL address the given STA updates its STA TT entry with. Whatever the way of retrieving the LL destination source, the location bit, which is comprised in an ARI message and in the STA TT for each entry, indicates whether the destination device belongs to the same LL network or not. Depending on it, illustrated by step 405, one ACC-PDU type is selected to embed the received ACC SDU, in order to limit the signalling overhead generated by the address part.

When the packet transmission is internal, step 406 is performed. There is no need to carry any UL address on the medium. Therefore, the ACC-SDU is encapsulated into an ACC-PDU type 0. However, when the location bit is equal to external, a GW will handle this packet to allow the interconnection of LL networks. Therefore, the message is encapsulated into an ACC-PDU type 2, as illustrated in step 407, and the destination UL address is copied into the destination UL Address field of the ACC-PDU header.

It shall be noted that broadcast ACC-SDUs are preferably encapsulated into an ACC-PDU type 1 in order to limit the number of ULAR messages sent by all STAs on reception of a broadcast ACC-PDU.

Performing step 408, the ACC-SL transmits the ACC-PDU to the L-SL and passes its own LL address as the source LL address and the destination LL address retrieved as explained previously.

Figure 5:
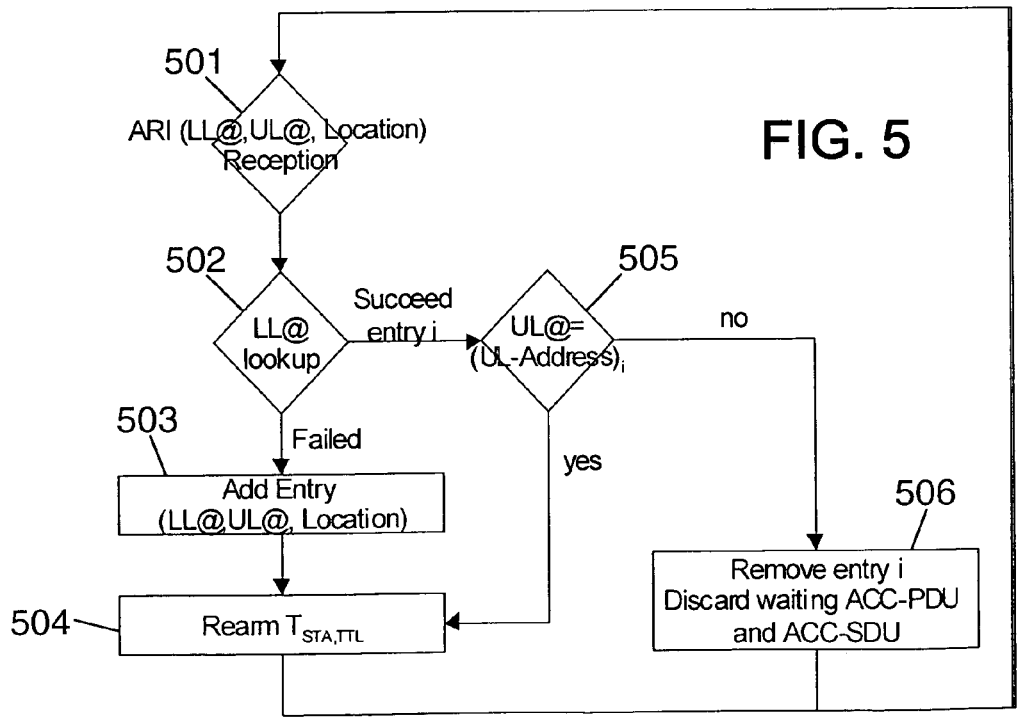
FIG. 5 is a flow chart describing the operation performed by a device for processing a message of an Address Management protocol according to one embodiment of the present invention.

FIG. 5 is a flow chart that describes the process applied by an STA on an ARI message reception. It shall be noted here that according to a preferred embodiment of the present invention, an ARM unit broadcasts each ARI message to all devices associated in its corresponding LL-network. Consequently this message is used to synchronise all devices regarding the address information. On an ARI message reception, corresponding to step 501, a STA scans the entries of its STA TT by performing step 502. If the address information received through the ARI message is valid and it is not yet or no longer present in the scanned STA TT, a corresponding entry i is created in step 503, while the corresponding T(STA, TTL,i) is started as illustrated in step 504. Else if an entry corresponding to the LL address received in the ARI message is already present in the STA TT. In this case, either the UL address received in the ARI message corresponds to the UL address of the corresponding entry in the STA TT or it does not, as illustrated in step 505. In the first case, the T(STA, TTL,i) is re-started (step 504). In the second case, the entry in the STA TT does not correspond to the information received in the ARI message (e.g. a previous ARI message has been missed by the STA): the information of the ARM unit and the information of the STA TT are not consistent. Consequently the given entry is removed from the STA TT and all AC-SL PDU packets and ACC-PDU packets waiting for address conversion are discarded as illustrated in step 506.

It shall be noted here that a STA TT is updated only on reception of ARI messages but never on reception of broadcast ACC-PDU, from which it could nevertheless be possible to deduce address information, because the location of the emitter (internal or external) cannot be determined by the receiver STA.

On reception of any L-SL message (data or signalling) from a STA belonging to the LL network, the timer T(STA, TTL, i) of the corresponding entry in the STA TT is re-started if the entry exists.

In conclusion, before emission of any L-SL message (data or signalling) to an STA of the LL network, the ACC-SL shall check whether the STA TT contains an entry corresponding to the destination STA. If not, an address conversion is performed, via the Address Management protocol, prior to sending message. Signalling messages toward the ARM unit do not require any address conversion since the ARM LL address is fixed. On expiration of the T(STA, TTL, i) timer, the corresponding entry shall be removed from the STA TT in order to handle STA TT of an acceptable size and to increase the address conversion efficiency.

The operations of the GW are based on a GW TT. A GW belongs to at least two different LL networks, and manages one GW TT per LL network it belongs to. At the UL level, the GW further manages a Relaying Table, which comprises the list of UL addresses of all devices associated in all LL networks including the GW. When a packet is received from one LL network, it is relayed to the LL network the destination device belongs to, when the UL address of the destination device is included in the Relaying Table. When this UL address is not found in the Relaying Table, the packet is replicated over all LL networks including the GW, except the LL network it is received from. In this last case, the packet is independently handled by each LL network by applying the procedure described above.

Each GW TT contains a list of entries, each one representing an associated device of the given LL network. One permanent entries are always present in the GW TT that corresponds to the reserved addresses used for broadcast, (UL address (broadcast), LL address (broadcast), external).

The GW only keeps, in the GW TT, the entries of the devices the GW communicates with. For each entry i in the GW TT, except for the permanent one, a timer T(STA,TTL, i) is defined.

Figure 6:
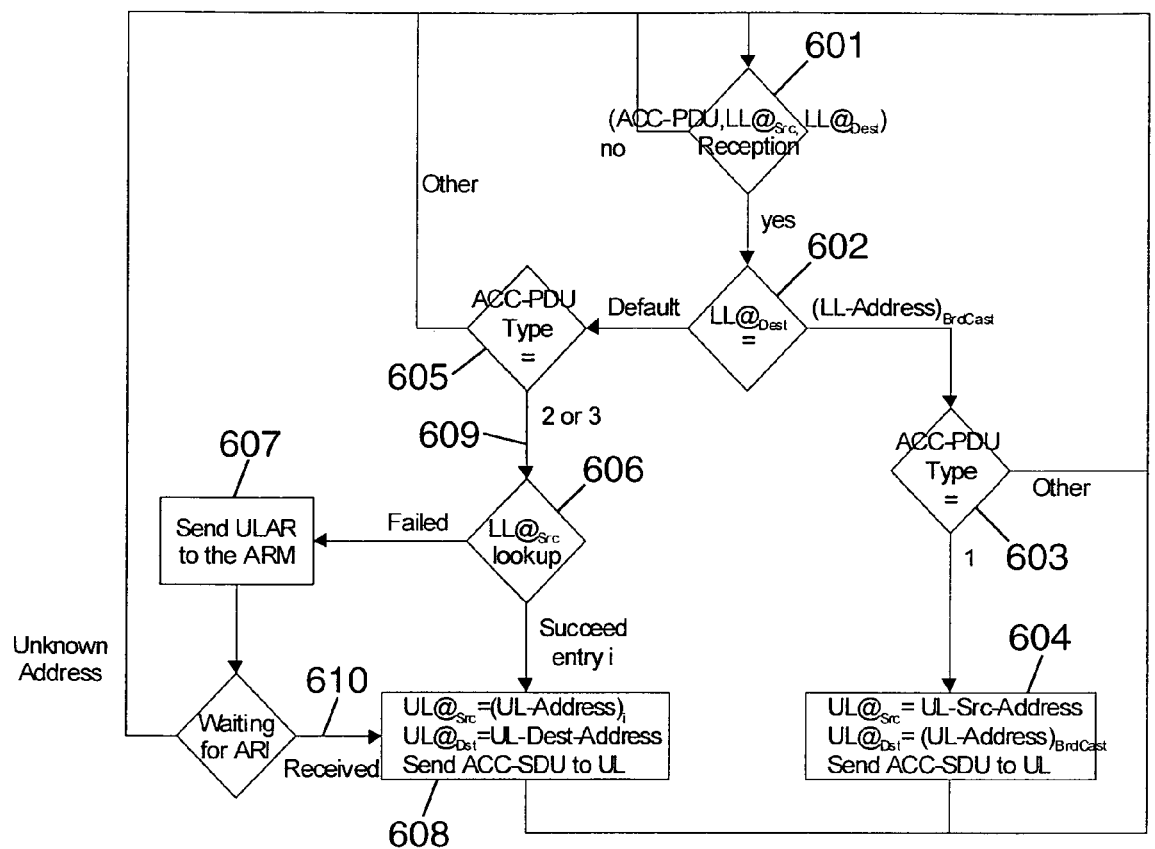
FIG. 6 is a flow chart of the processing steps carried out by a gateway on reception of a packet at LL level.

FIG. 6 is a flow chart of the steps carried out by a GW on reception of a packet at LL level. On reception of an ACC-PDU packet from the L-SL, the ACC-SL retrieves the source UL address 202 and the destination UL address to pass them as parameters up to the UL, as illustrated in step 601. As the GW is not the destination device, the ACC-SL only processes the packet with an ACC-PDU, type 2 or 3 as illustrated in step 605, i.e. in which at least the destination UL address is included. Of course, this rule is not applied to the broadcast messages which are preferably encapsulated into an ACC-PDU type 1, as illustrated in steps 603 and 604: the ACC-SL of the GW passes the destination UL address parameter filled in with the UL address (broadcast) retrieved in the corresponding GW TT. For a packet with an ACC-PDU type of 2 or 3, as illustrated in step 609, the destination UL address parameter is filled with the destination UL address retrieved in the ACC-PDU header.

Concerning the source UL address 202, either it is in the ACC-PDU header when it is an ACC-PDU type 3 and then the source destination UL parameter is filled with it; or this information will be retrieved from the source LL address which has been passed as parameter with the received ACC-PDU from the L-SL. At this step of the procedure, either the source LL address corresponds to an entry in the GW TT and then the source UL address 202 is retrieved from the entry in the GW TT, or no entry in the GW TT matches it, and the GW applies the same procedure as an STA, as illustrated by steps 606 and 607. A ULAR message is sent to the corresponding ARM unit which returns an ARI message providing the requested source UL address 202, as illustrated by step 610. Then step 608 is performed by sending the ACC-SDU to the UL by passing the source UL address 202 and the destination UL address as parameters.

Figure 7:
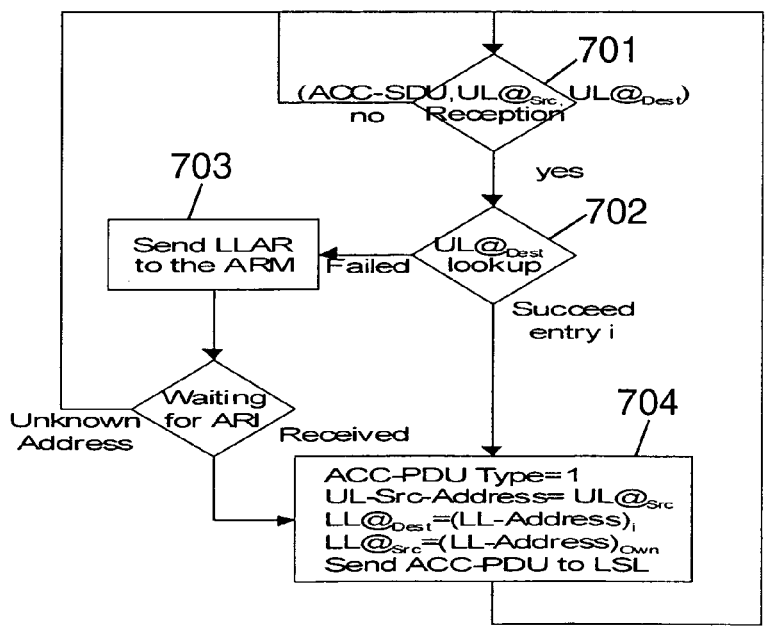
FIG. 7 is a flow chart of the processing steps carried out by a gateway on reception of a packet at UL level.

FIG. 7 is a flow chart of the steps carried out by a GW on reception of an ACC-SDU from the UL by the ACC-SL. During the packet transmission process, an ACC-SDU packet is received from the UL in the ACC-SL in step 701. Performing step 702, if the GW TT does not comprise an entry corresponding to the destination UL source received as parameter, an LLAR message is sent to the ARM unit of the LL network, as illustrated in step 703. When the destination LL address is retrieved, either from a GW TT or via the ARM unit, the ACC-SDU packet is encapsulated into an ACC-PDU type 1, where the source UL address 202 received as parameter is filled in the ACC-PDU header, as illustrated in step 704. The ACC-PDU packet is transmitted to the L-SL with the source and destination LL addresses passed as parameters. The destination LL address parameter will be converted from the destination UL address received as parameter.

The timers T(STA, TTL, i) in the GW TT are managed in the same way as for the STA TT.

Figure 8:
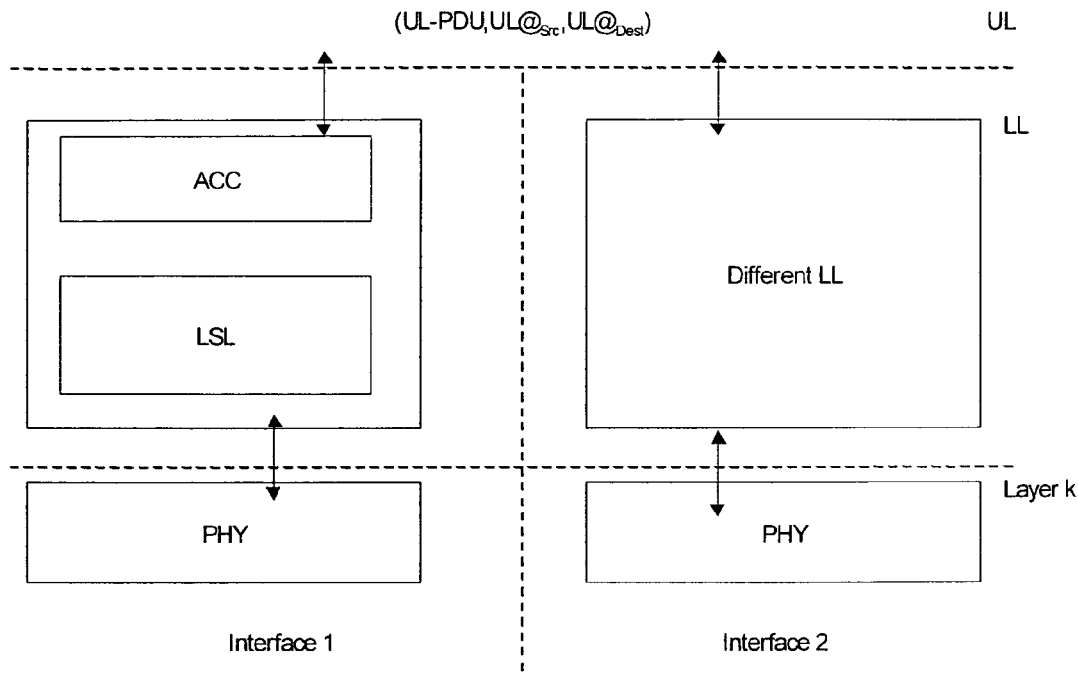
FIG. 8 illustrates an exemplary view of a protocol stack in a gateway according to one embodiment of the invention.

FIG. 8 illustrates an exemplary view of a protocol stack in a gateway according to one embodiment of the invention.

Now, the Address Management of an embodiment of the present invention has been detailed on each side of devices in a network: on the ARM unit side, on the STA side and on the GW side.

The following sections will detail an exemplary internal packet transmission and an exemplary external packet transmission according to one embodiment of the present invention.

Figure 9:
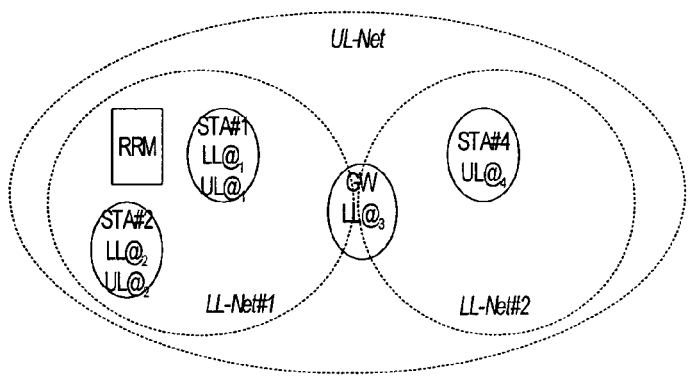
FIG. 9 illustrates the topology of the network where the different exemplary packet transmissions are described in the following figures.

FIG. 9 illustrates the topology of the network where the different exemplary packet transmissions are described. A UL network is composed of two LL networks, LL-Net#1 and LL-Net#2. The network LL-Net#1 is formed by an ARM unit, a device STA#1 with LL address LL@1 and UL address UL@1, and a device STA#2 with LL address LL@2 and UL address UL@2. The network LL-Net#2 is composed by a device STA#4 with UL address UL@4. A GW with LL address LL@3 interconnects these LL networks.

Figure 10:
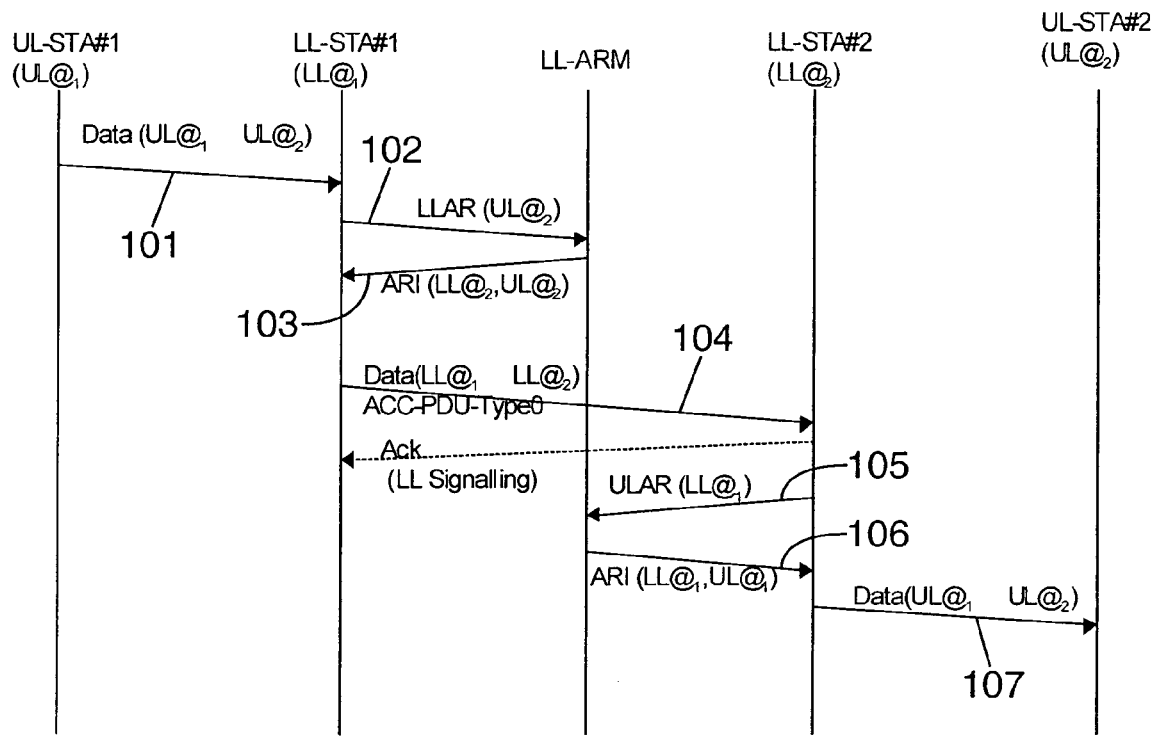
FIG. 10 illustrates an internal packet transmission from a device towards another device.

FIG. 10 illustrates an internal packet transmission from the STA STA#1 towards the STA STA#2 101. A Data packet is transmitted from the UL to the LL with the destination UL address UL@2 passed as parameter. The STA TT managed by the ACC-SL of the STA STA#1 does not contain the entry corresponding to the STA STA#2. Therefore, the ACC-SL of the STA STA#1 sends an LLAR message (102) to convert the UL@2 into the corresponding LL@2 in order to be able to transmit the Data packet to the L-SL with LL@2 passed as parameter, as it is illustrated in FIG. 2. On reception of the ARI message (103) from the ARM unit, the LL of the STA STA#1 is informed about the location of the destination device: the bit location in the ARI message is equal to internal. In order to reduce the signalling overhead, the LL of the STA STA#1 encapsulates this Data packet into an ACC-PDU of type 0. The LL of the STA STA#2 receives the data packet (104). The L-SL transmits it up to the ACC-SL with the LL@1 and LL@2 as parameters. The ACC-SL is not able to convert the LL@1 into UL@1 via its STA TT. Therefore a ULAR message (105) is sent to the ARM unit to request the corresponding UL@1. On reception of the ARI message (106), the ACC-SL of the STA STA#2 is able to pass the data packet with UL@1 and UL@2 as parameters (107) to the UL.

Figure 11:
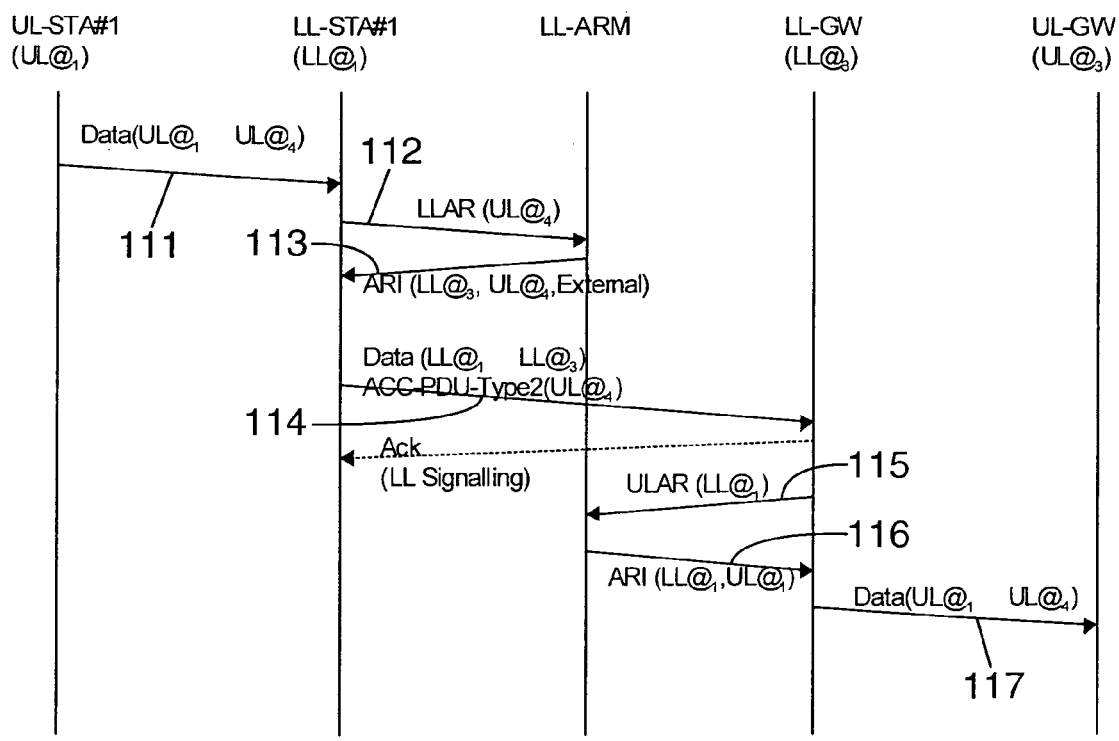
FIG. 11 illustrates an external data packet transmission from a first device towards a second device which belongs to a different LL network.

FIG. 11 illustrates an external data packet transmission from the STA STA#1 towards the STA STA#4, which is in the network LL-Net#2. As in FIG. 10, the Data packet is transmitted to the LL with the UL@1 and the UL@4 as parameters (111). The STA STA#1 does not find an entry in its STA TT matching the UL@4. Therefore, a ULAR message (112) is sent to the ARM unit. The corresponding ARI message (113) provides the LL address of the Gateway LL@3 indicating that the STA STA#4 is an external device. The ACC-SL of the STA STA#1 encapsulates the Data packet into an ACC-PDU of type 2 in order to include the UL@4 in the ACC-PDU header so that the destination address UL@4 is carried over the medium in the data packet transmitted to the GW (114). The GW TT does not contain the entry corresponding to the STA STA#1. Therefore, it sends a ULAR message (115) and receives an ARI message (116) with the corresponding UL@1. The LL is able to transmit up to the UL the Data packet with UL@1 and UL@4 as parameters (117).

Figure 12:
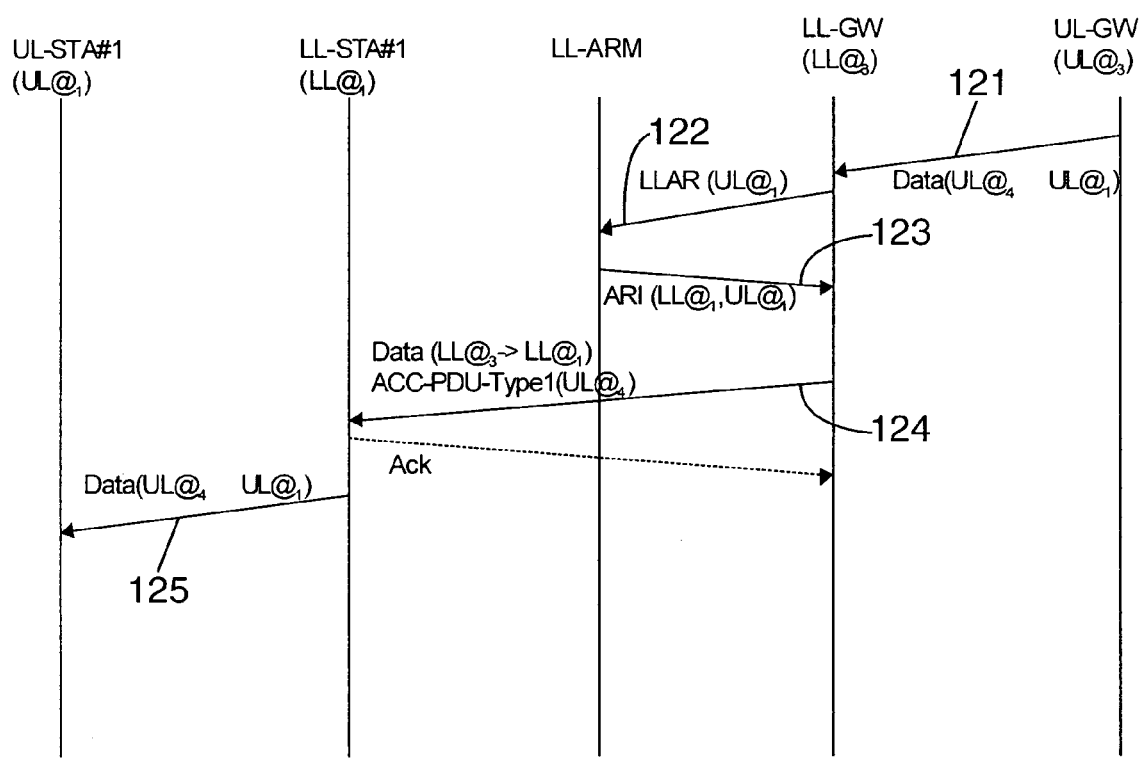
FIG. 12 illustrates the reception of an external data packet within a given LL network.

FIG. 12 illustrates the reception of an external data packet within the network LL-Net#1. The UL of the GW passes to the LL the Data packet with source UL address UL@4 and destination UL address UL@1 as parameters (121). The GW TT does not contain an entry for the STA STA#1. Therefore it sends an LLAR message (122) to convert UL@1. On reception of the corresponding ARI message (123), the LL of the GW sends the data packet (124), encapsulated into an ACC-PDU type 1, to the LL of the STA STA#1. The L-SL of the STA STA#1 passes this packet to the ACC-SL with LL@3 and LL@1 as parameters (125). The ACC-SL retrieves UL@4 from the ACC-PDU header and retrieves UL@1 corresponding to the LL@1 from its STA TT. It is then able to pass this data packet up to the UL.

Figure 13:
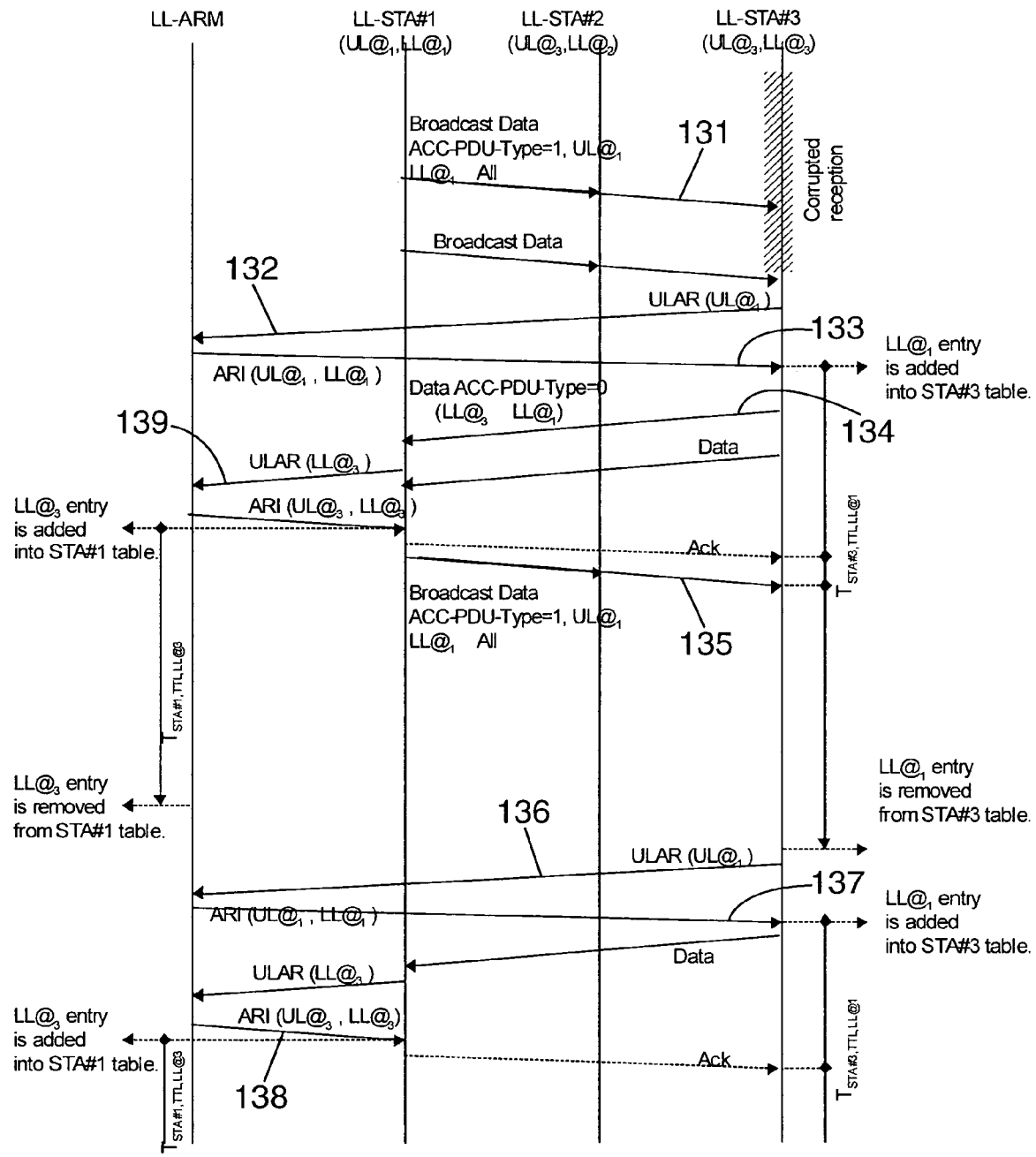
FIG. 13 illustrates the timer management in the three devices within a single LL network.

FIG. 13 illustrates the timer management in the following STAs: STA#1, STA#2 and STA#3 within a single LL network. STA#1 broadcasts a Data packet 131, encapsulated into an ACC-PDU, type 1 i.e. without the destination address. The Data packet is received by STA#2 and STA#3. STA#3 does not find any entry matching UL@1 received in the broadcast data packet. Therefore, it sends a ULAR message (132) to the ARM unit. On reception of the corresponding ARI message (133), STA#3 updates its STA TT by adding an entry corresponding to STA#1. The timer T(STA#3, TTL, LL@1) is started. Another broadcast message (135) is received by STA#3 and timer T(STA#3, TTL, LL@1) is re-started. The timer expires before any other messages have been received by STA#3 from STA#1. Therefore, the entry in the STA TT of STA#3 corresponding to STA#1 is removed. STA#3 sends a Data packet to STA#1 after having removed the corresponding entry in the STA TT. A ULAR message (136) is sent to the ARM unit to request LL@1. On ARI reception (137), the STA TT is updated with the new entry corresponding to STA#1. On STA#1 side, the same process is handled. On reception of the ARI(UL@3, LL@3) message (138), the LL of STA#1 updates its STA TT with an entry corresponding to LL@3 and arms its timer T(STA#1, TTL, LL@3). On expiration of this timer, as no other message has been received from STA#3, the LL of STA#1 removes the entry corresponding to STA#3. When STA#1 receives a packet from STA#3, a ULAR message (139) is sent to the ARM unit and on reception of the ARI message, the STA TT updates its STA TT with the new entry corresponding to STA#3, and so on.

Figure 14:
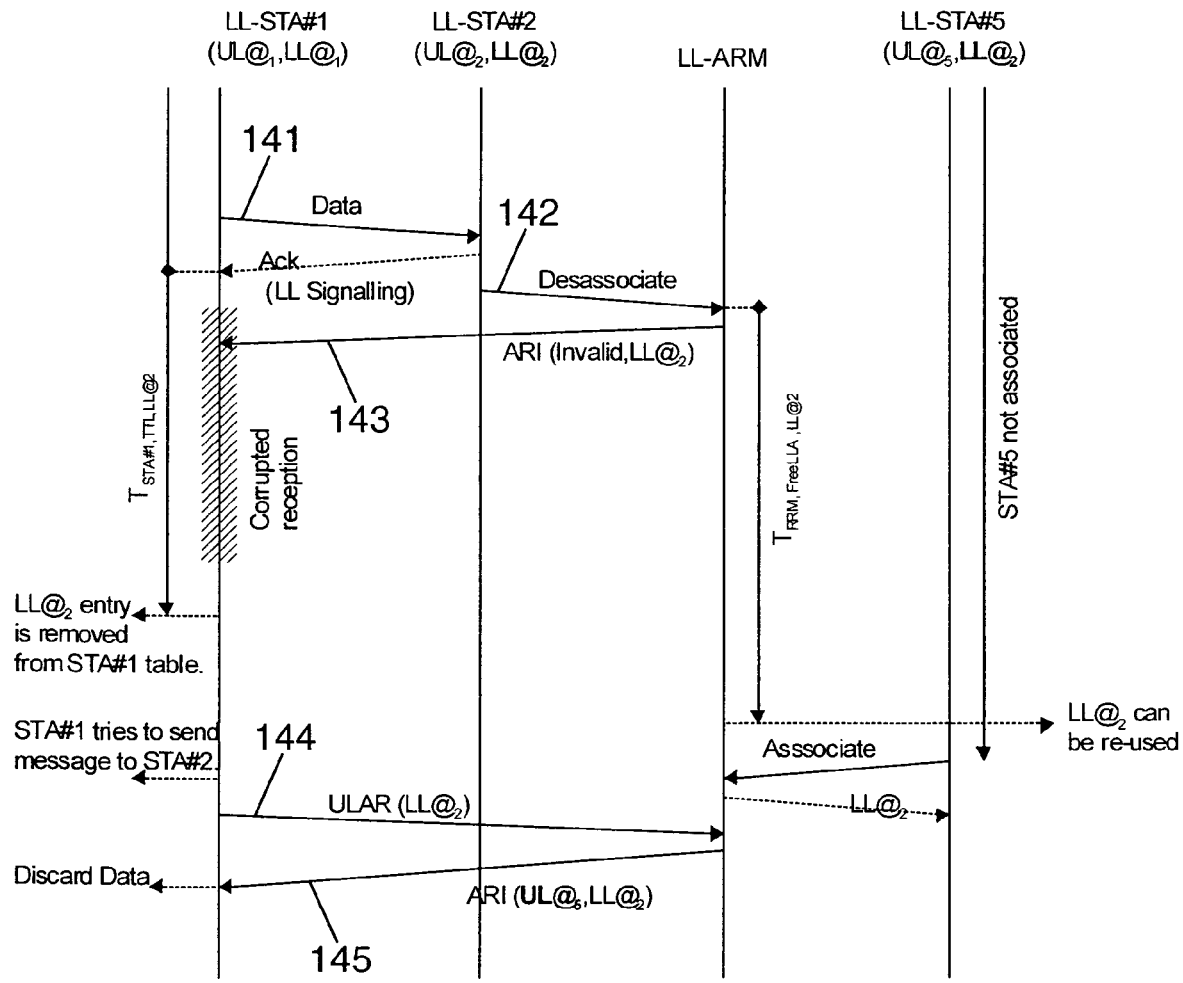
FIG. 14 illustrates the timer management in the ARM unit when a device is disassociated.

FIG. 14 illustrates the timer management in the ARM unit when a STA is disassociated. STA#1 transmits a data packet to STA#2. STA#2 sends a message (142) to the ARM unit to disassociate itself. The ARM unit broadcast an ARI message (143) with an invalid address and LL@2. Due to error, STA#1 is not able to handle this ARI message. However, STA#2 entry in the STA TT of STA#1 is removed because of the expiration of the timer T(STA#1, TTL, LL@2). When STA#1 tries to transmit a packet to STA#2, it sends a ULAR message with LL@2 (144), and receives an ARI message (145) containing UL@5, which corresponds to the new device associated with the LL address LL@2. STA#1 discards the packet.

Consequently, the present invention provides an Address Management allowing to increase the performance and the protocol efficiency in a network thanks to:
  a dynamic centralised address allocation management, which allows to optimise and more precisely reduce the address format,
  an efficient Address Resolution based on:
    using an efficient address conversion process which is easy to implement and robust against broadcast packet loss,
    efficiently selecting addresses to be carried in each packet transmitted in order to reduce overhead due to addressing information.

Consequently, the invention optimises the usage of the transmission resource and reduces the signalling overhead thanks to a short LL address format and a reduced UL addressing information overhead transmitted over the medium is limited. The performance of the communication protocol is increased by an efficient resolution scheme, which offers a short delays when performing address resolution.

The invention claimed is:

1. A method of Address Management in a network which comprises a plurality of devices, comprising at least one STAtion (STA), and at least one Address Resource Management (ARM) unit, wherein each of the devices includes a stack of communication protocol layers comprising at least an Upper network or data link Layer (UL) and a Lower data link Layer (LL), the UL of each of the devices having a respective UL address within the network, the method comprising:
  associating, respectively disassociating, at least one device in at least one LL network, which device being allowed to exchange together data packets emitted and received at the LL level, the associating including the device sending a UL address to the ARM unit;
  allocating, respectively releasing, one given LL address per UL address of each one of the at least one device which is associated, respectively disassociated, in a given LL network, the allocating being carried out by the ARM unit; and
  handling one ARM Translation Table (TT) per LL network, the TT comprising one entry per device of a given LL network, which entry comprising the UL address and the LL address, the handling being carried out by the ARM unit,
  wherein the device associated in a given LL network performs address conversion between an LL address and a UL address through an Address Management protocol defining messages exchanged with the corresponding at least one ARM unit,
  wherein the Address Management protocol comprises the following messages:
  a Lower Layer Address Request (LLAR) message sent by any device to the ARM unit, the LLAR message comprising a specified UL address in order to request the corresponding LL address;
  an Upper Layer Address Request (ULAR) message sent by any device to the ARM unit, the ULAR message comprising a specified LL address in order to request the corresponding UL address; and an Address Relation Indication (ARI) message broadcast to all associated devices of the LL network to manage advertising of an LL-UL address couple by the ARM unit:
in response to either the LLAR message or the ULAR message, the ARI message comprising the UL address and the LL address, respectively sent or requested via the LLAR message or the ULAR message; and
each time a device is associated or disassociated.

2. The method of claim 1, wherein the ARM TT comprises at least the following information for each device of the LL network:
the UL address of the device;
the LL address of the device; and
an operational status of the device.

3. The method of claim 2,
wherein the ARM unit performs the allocating a LL address by handling a Free Address List, which includes LL addresses available for allocation to respective devices to be associated in the corresponding LL network, and
wherein the handling comprises selecting one LL address in the Free Address List each time an address allocation is performed, and removing the selected LL address from the Free Address List, each LL address allocated to a respective device within the corresponding LL network being unique within that LL network.

4. The method of claim 3, wherein each device associated in a given LL network performs an address conversion between a LL address and an UL address through an Address Management protocol defining messages exchanged with the corresponding at least one ARM unit.

5. The method of claim 4, wherein, in order to disassociate a given device from the LL network it belongs to, the corresponding ARM unit performs:
removing the corresponding entry from the ARM TT;
including the corresponding LL address in the Free Address List; and
transmitting an ARI message to all devices associated in the LL network with the LL address and with the corresponding UL address marked as invalid.

6. The method of claim 5, wherein the removing the corresponding entry is preceded by the following:
setting the operational status of the entry in the ARM TT corresponding to the removed device with a "defunct" value; and
waiting for a predetermined time, which has been defined for this entry.

7. The method of any one of claim 5 or 6, wherein the ARM unit performs the address conversion by performing:
receiving a LLAR message, or an ULAR message, from an associated device, the message comprising a LL address, respectively an UL address;
scanning all the entries in the ARM TT in order to retrieve the UL address, respectively the LL address, which corresponds to the received LL address, respectively UL address; and
transmitting an ARI message to all the associated devices, which message includes the LL address and the UL address.

8. The method of any one of claim 5 or 6, wherein each ARI message is broadcast to all associated devices in a given LL network by the corresponding at least one ARM unit.

9. The method of any one of claim 5 or 6, wherein the ARM unit marks as invalid the UL address, respectively the LL address, in the corresponding ARI message if the LL address received via a ULAR message, respectively the UL address received via an LLAR message, does not correspond to a valid entry in its ARM TT.

10. The method of claim 7, wherein the LL comprises an Address Conversion Control Sub-Layer (ACC-SL) and a Lower Sub-Layer (L-SL), the ACC-SL performing an address conversion between a LL address and an UL address within a given LL network.

11. The method of claim 10, wherein the UL transfers an UL Protocol Data Unit (PDU) to the LL, the UL-PDU being received in the LL first by the ACC-SL, which adds an ACC-PDU header of variable length to the UL PDU to form an ACC-PDU before transferring the ACC-PDU to the L-SL.

12. The method of claim 11, wherein the ACC-PDU header comprises an ACC-PDU type field only, or further comprises a source UL address field and/or a destination UL address field, depending on the value included in the ACC-PDU type field.

13. The method of claim 11, wherein, for each UL-PDU transferred to the ACC-SL, the UL provides the ACC-SL with the source UL address and the destination UL address as parameters, and then for each ACC-PDU transferred to the L-SL, the ACC-SL provides the L-SL with the source LL address and the destination LL address as parameters.

14. The method of claim 13, wherein the ACC-SL retrieves the destination LL address by performing an address conversion from the destination UL address received as parameter.

15. The method of claim 13, wherein each STA handles a STA Translation Table (STA TT) permanently comprising at least the two following entries:
its own UL and LL addresses; and
an UL broadcast address and a LL broadcast address, which are used for transmitting broadcast messages.

16. The method of claim 15, wherein the STA TT further comprises one entry per device the STA is able to communicate with, each entry including the following information:
the corresponding LL and UL addresses; and
a Location field, which contains "internal" or "external" value, depending on whether the corresponding device is internal or external to the considered LL network, respectively.

17. The method of claim 15, wherein the STA TT is updated by the corresponding ACC-SL on reception of the ARI messages only, the update comprising:
checking whether an entry corresponding to the LL address received in the ARI message is already present in the STA TT, and
if not, creating the corresponding entry and starting a corresponding timer,
otherwise, checking if the received UL address is valid and is the same address as included in the STA TT as corresponding to the LL address,
if not, removing the corresponding entry and discarding all data packets which are intended for the device corresponding to the removed entry,
otherwise, re-starting the timer;
and wherein an entry is removed on the expiration of the timer.

18. The method of claim 15, wherein the ACC-SL of a given STA retrieves the destination LL address from the destination UL address received as parameter, either locally by scanning its STA TT if the required LL address is present, or via the Address Management conversion performed by the ARM unit by performing the following if no entry in the STA TT corresponds to the required address:

transmitting to the ARM unit a LLAR message with the UL address received from the UL as the source UL address parameter; and receiving from the ARM unit an ARI message with the UL address and the corresponding requested LL address.

19. The method of claim 18, wherein the ACC-SL of a STA adds an ACC-PDU header to an UL-PDU to form an ACC-PDU to be transferred to the L-SL, the ACC-PDU header solely comprising the ACC-PDU type field if the destination device is internal within the same LL network as the STA, or further comprising the destination UL address filled in the destination UL address field if the destination device is external to the considering LL network.

20. The method of claim 18, wherein the ACC-SL of a STA adds an ACC-PDU header to an UL-PDU to form an ACC-PDU to be transferred to the L-SL and broadcast, the ACC-PDU header comprising its own UL address as the source UL address field.

21. The method of claim 11, wherein the L-SL provides the ACC-SL with the source LL address and the destination LL address as parameters for each ACC-PDU transferred to the ACC-SL, and then the ACC-SL provides the UL with the source UL address and the destination UL address as parameters for each ACC-PDU transferred to the UL.

22. The method of claim 21, wherein the source UL address is selectively retrieved by the ACC-SL based on the value of the ACC-PDU type field, either by retrieving it from the ACC-PDU header of the received ACC-PDU if the source UL address is comprised in the ACC-PDU header, or by retrieving it from the source LL address.

23. The method of claim 15, wherein the ACC-SL of a given STA retrieves a source UL address from a source LL address either locally by scanning its STA TT if the required UL address is present, or else via the Address Management conversion performed by the ARM unit by performing the following:

transmitting to the ARM unit an ULAR message with the LL address being the source UL address parameter; and receiving from the ARM unit an ARI message with the LL address and the corresponding requested UL address.

24. The method of claim 15, wherein the ACC-SL of a given STA retrieves a destination UL address from one of the permanent entries in STA TT, in accordance with the destination LL address received as parameter.

25. The method of claim 11, wherein the network comprises several LL networks, and at least one ARM unit per LL network, and wherein each LL network comprises at least one STA and at least one GateWay (GW) as an interconnection device allowing a data packet transmission through all LL networks in the network, the GW belonging to at least two LL networks with one LL address per LL network it belongs to, and inter-connecting the devices comprised in those LL networks it belongs to.

26. The method of claim 25, wherein an entry in the ARM TT corresponding to a GW belonging to the corresponding LL network is extended with the list of UL addresses of those devices not belonging to the LL network which are managed by the GW.

27. The method of claim 25, wherein the ARM unit uses, in the ARM IT, a given GW entry as a default entry when an UL address does not match any ARM U entry, the list of UL addresses corresponding to the GW entry being empty.

28. The method of claim 25, wherein the ARI message comprises the LL address of the GW, when the UL address corresponds to a device belonging to a LL network, other than the LL network which comprises the ARM unit, and interconnected through the GW.

29. The method of claim 25, wherein an ARI message further comprises a location information which indicates whether the device corresponding to the addresses exchanged with the ARM unit through the ULAR and/or the LLAR messages, is a device belonging to the same LL network as the ARM unit, or a device belonging to another LL network interconnected through a GW device.

30. The method of claim 25, wherein each GW handles a GW Translation Table (GW TT) per LL network it belongs to, the GW TT permanently comprising at least the following entry:

an UL broadcast address and a LL broadcast address used for transmitting broadcast messages.

31. The method of claim 30, wherein a GW further handles in the UL a Relaying Table in order to select the GW TT corresponding to the destination LL network of a received PDU to be transmitted.

32. The method of claim 30, wherein the GW TT further comprises one entry per device associated in the corresponding LL network STA is able to communicate with, which entry includes the following fields:

the corresponding LL and UL addresses.

33. The method of claim 30, wherein the GW TT is updated by the corresponding ACC-SL only on reception of the ARI messages according to:

checking whether an entry corresponding to the LL address received in the ARI message is already present in the GW TT if not, creating the corresponding entry and starting a corresponding timer is started, otherwise, checking if the received UL address is valid and is the same address as included in the GW TT as corresponding to the LL address, if not, removing the corresponding entry, otherwise, the timer corresponding to the valid entry is re-started, and wherein an entry is removed from the GW TT on expiration of the timer.

34. The method of claim 25, wherein the ACC-SL of a GW processes an ACC-PDU, transferred by the L-SL, only if its ACC-PDU header includes the destination UL address in its destination UL address field.

35. The method of claim 34, wherein the ACC-SL of the GW processes only an ACC-PDU with an ACC-PDU header including at least the source UL address field filled in with the source UL address when the destination LL address is a broadcast address.

36. The method of claim 34, wherein the ACC-SL of a given GW retrieves a source UL address from a source LL address either locally by scanning its GW TT if the required UL address is present via the Address Management conversion performed by the ARM unit by performing:

transmitting to the ARM unit an ULAR message with the LL address being the source UL address parameter; and receiving from the ARM unit an ARI message with the LL address and the corresponding requested UL address.

37. The method of claim 34, wherein the ACC-SL of a GW adds an ACC-PDU header to a UL-PDU to form an ACC-PDU to be transferred to the L-SL, the ACC-PDU header comprising at least the source UL address field including the source UL address.

38. The method of claim 34, wherein the ACC-SL of a given GW retrieves the destination LL address from the UL address received as parameter, either locally by scanning its corresponding GW TT if the required LL address is present, or via the Address Management conversion performed by the ARM unit by performing the following if no entry in the GW TT corresponds to the required address:
  transmitting to the ARM unit a LLAR message with the UL address received from the UL as the source UL address parameter; and
  receiving from the ARM unit an ARI message with the UL address and the corresponding requested LL address.

39. The method of claim 1, wherein the network comprises at least two LL networks, a first LL network supporting a communication protocol A and a second LL network supporting a communication protocol B, the communication protocols being different.

* * * * *